United States Patent [19]

Ahrens et al.

[11] Patent Number: 4,930,943

[45] Date of Patent: Jun. 5, 1990

[54] SILO FOR STORING AND DISCHARGING BULK MATERIAL AND METHOD OF OPERATING SUCH SILO

[75] Inventors: Norbert Ahrens, Oelde; Wolfgang Kluger, Beckum; Joachim-Rudolf Mihatsch, Warstein-Allagen; Hans-Jürgen Rzadki, Ahlen, all of Fed. Rep. of Germany

[73] Assignee: Krupp Polysius AG, Fed. Rep. of Germany

[21] Appl. No.: 279,504

[22] Filed: Dec. 5, 1988

[30] Foreign Application Priority Data

Dec. 22, 1987 [DE] Fed. Rep. of Germany ....... 3743637

[51] Int. Cl.[5] .............................................. B65G 69/08

[52] U.S. Cl. ...................................... 406/90; 406/134; 406/137

[58] Field of Search ...................... 406/86, 122, 89–92, 406/134, 137, 138, 142, 146, 163; 222/195

[56] References Cited

U.S. PATENT DOCUMENTS

| | | | |
|---|---|---|---|
| 3,260,389 | 7/1966 | Paton | 406/91 |
| 4,078,703 | 3/1978 | Dressler | 406/91 |
| 4,082,205 | 4/1978 | Kluger et al. | 406/90 |
| 4,221,509 | 9/1980 | Balzau et al. | 406/91 |
| 4,364,665 | 12/1982 | Ahrens et al. | 406/90 |
| 4,375,335 | 3/1983 | Klein-Albenhausen | 406/90 |

FOREIGN PATENT DOCUMENTS

| | | |
|---|---|---|
| 303625 | 12/1972 | Fed. Rep. of Germany . |
| 2727499 | 12/1978 | Fed. Rep. of Germany . |

*Primary Examiner*—Joseph F. Peters, Jr.
*Assistant Examiner*—Anne Sartelle
*Attorney, Agent, or Firm*—Learman & McCulloch

[57] ABSTRACT

The invention relates to a bulk material silo and method operating such silo, the silo being provided with a central discharge chamber from which a venting channel leads to the peripheral wall of the silo, the side walls of the channel having openings of the material to enter. Such a silo construction ensures a symmetrical material supply to the discharge chamber over the entire periphery.

8 Claims, 2 Drawing Sheets

SILO FOR STORING AND DISCHARGING BULK MATERIAL AND METHOD OF OPERATING SUCH SILO

The invention relates to a silo for bulk material, and a method of operating such silo, the silo including a new and improved venting arrangement while retaining symmetrical material supply to a centrally located discharge chamber.

BACKGROUND OF THE INVENTION

A bulk material silo provided with a centrally located discharge chamber is known for example from AT-C-303 625. In this the venting system connected to the central discharge chamber is formed by a pipe running from the top of the conical discharge chamber centrally through the interior of the silo to the silo cover. A disadvantage of such a construction is the considerable mechanical stress to which this venting system is exposed by the material in the silo.

The prior art also includes silos (DE-B-25 39 753 and DE-A-27 27 499) in which the discharge of the material from the central discharge chamber is carried out through an emptying chamber which leads radially from the discharge chamber to the peripheral wall of the silo and through which the ventilation of the discharge chamber is carried out. On the peripheral wall of the silo a vent pipe leads from the emptying chamber to a dust collection arrangement or to the upper part of the interior of the silo. A disadvantage of a construction of this type is that such an emptying and venting chamber which is closed off against the interior of the silo considerably upsets the geometry of the silo and impairs the even inflow of material over the entire periphery from the interior of the silo to the central discharge chamber.

SUMMARY OF THE INVENTION

The object of the invention, therefore, is to provide a silo and method of operating such silo which avoid these disadvantages of the known constructions in such a way that in spite of a simple construction and the avoidance of undesirable mechanical stresses on the venting system an all-round even inflow of material from the interior of the silo to the central discharge chamber is ensured over the entire periphery.

In the silo according to the invention the venting system contains a venting channel which is known per se, leads from the discharge chamber to the peripheral wall of the silo and is connected to a vent pipe. According to the invention the side walls of this venting channel have openings through which material flows out of the interior of the silo to the venting channel and through the latter to the central discharge chamber. Thus the venting channel both facilitates the transport of material to the central discharge chamber and in this way ensures an even and axially symmetrical supply to the central discharge chamber.

THE DRAWING

One embodiment of the invention is illustrated in the drawings, in which.

DETAILED DESCRIPTION

Figure 1:
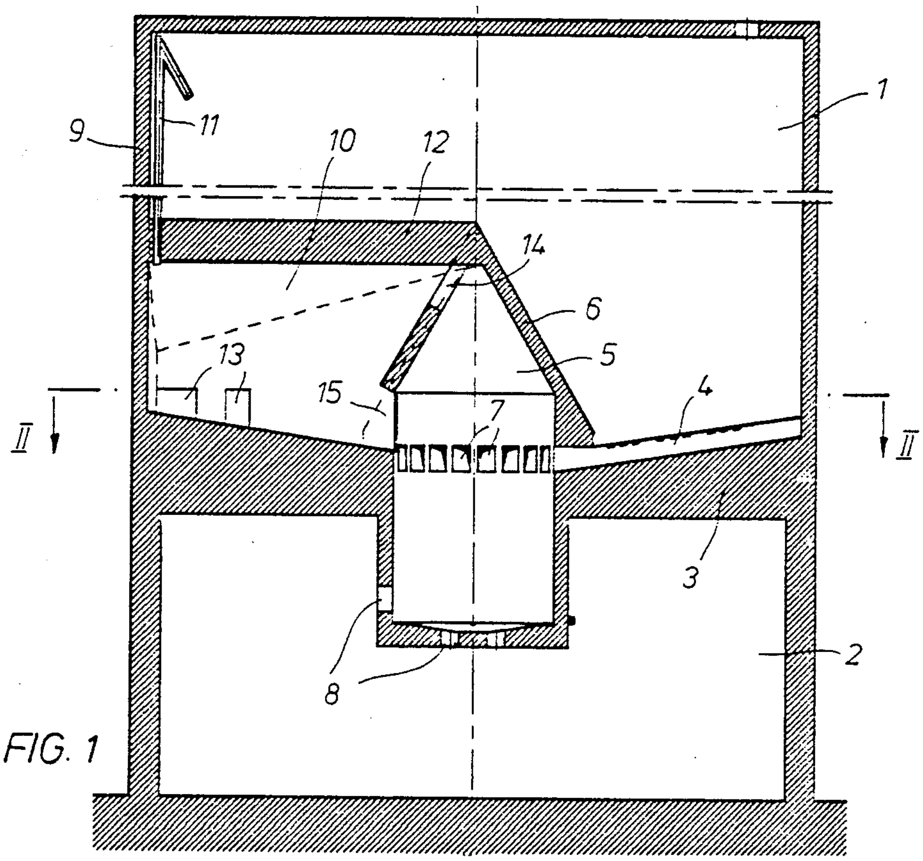
FIG. 1 shows a vertical section through a silo according to the invention.
Figure 2:
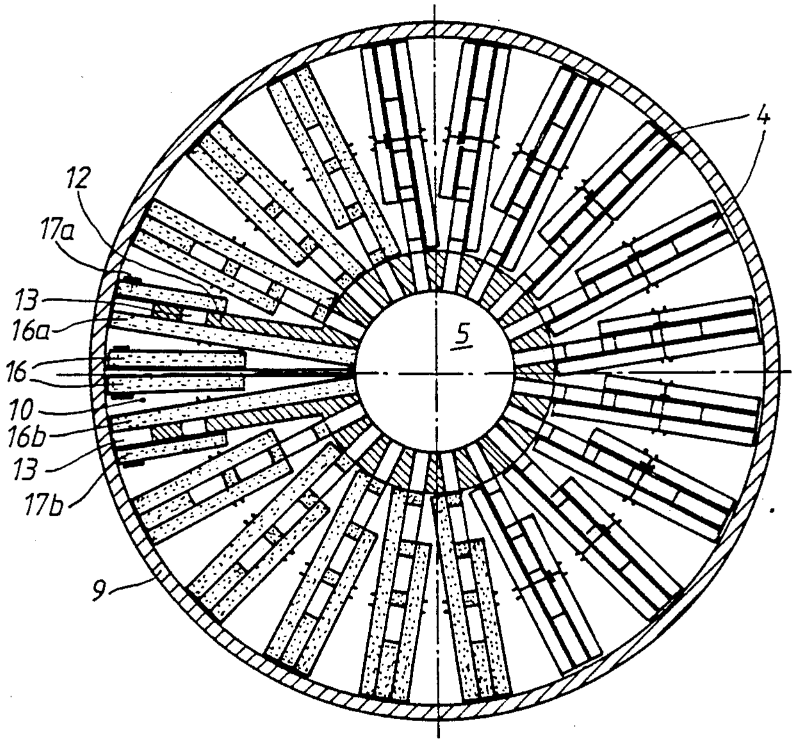
FIG. 2 shows a section along the line II—II in FIG. 1.

The bulk material silo illustrated in the drawings contains a silo chamber 1 to accommodate the bulk material and a chamber 2 which serves to accommodate conveying arrangements.

The base 3 of the silo chamber 1 is arranged in a known manner so that it is inclined towards the centre and provided with pneumatic aerating arrangements 4.

A discharge chamber 5 which is surrounded by a conical dome 6 is arranged centrally above the base 3. Openings 7 through which the material from the silo chamber 1 enters the central discharge chamber 5 are provided on the lower edge of the dome 6. The discharge chamber 5 extends through the base 3 and is provided in its lower region with material discharge openings 8.

A venting system which contains a venting channel 10 leading from the discharge chamber 5 to the peripheral wall 9 of the silo is connected to the discharge chamber 5, and a vent pipe 11 which leads to the upper part of the silo chamber 1 is connected to the venting channel.

The venting channel 10 is provided with a straddling cover 12 and has in its side walls openings 13 through which material from the silo chamber 1 enters the venting channel 10 and flows through this venting channel to the discharge chamber 5.

The venting channel 10 is on the one hand connected to the discharge chamber 5 by a vent opening 14 located in the upper region of the discharge chamber and on the other hand communicates with the discharge chamber 5 by a material discharge opening 15 which lies immediately above the base 3 of the silo.

The base of the venting channel 10 is provided with pneumatic aerating arrangements 16 which serve to deliver the material passing through the openings 13 from the silo chamber 1 and entering the venting chamber to the discharge chamber 5. Furthermore, to assist this movement of material the base 3 of the silo chamber is also provided with pneumatic aerating arrangements **17*a*, 17*b* immediately before the openings 13 in the venting channel 10**.

Apart from the aerating arrangements 16 arranged approximately centrally in the venting channel 10, lateral aerating arrangements **16*a*, 16*b* which are arranged in the region of the openings 13 are also provided in the base of the venting channel 10**.

The silo is advantageously operated as follows using the method according to the invention:

Two separate blowers are used, of which the first blower serves for aeration of the central discharge chamber 5 and the second blower for aeration of the silo base 3 and the venting channel 10.

During operation of the silo both blowers are permanently switched on. The first blower continuously aerates the central discharge chamber 5 and the second blower alternately aerates either the silo base 3 or the venting channel 10. In detail this takes place as follows:

If the filling level in the central discharge chamber 5 has fallen to a minimum value so that the aerating pressure of the central discharge chamber has reached a set minimum value, then the aeration of the aerating arrangements 16 of the venting channel 10 is switched off and the aeration of the silo base 3 is switched on. For this purpose, for example, two grooves lying opposite one another can be aerated with their aerating arrangements 4. During the resulting filling of the central discharge chamber 5 the air from the aeration of the central discharge chamber and the air from the silo aeration as well as the air forced out of the central discharge chamber by the rising filling level is led off via the venting channel 10.

When the filling level in the central discharge chamber 5 reaches a maximum value which is shown by a filling level indicator or signalled by a maximum value of the aerating pressure, or if a set time period for filling has elapsed, then the aeration of the silo base is switched off and instead the aerating arrangements 16 of the venting channel 10 are switched on. In this way the material which has entered the venting channel 10 during filling of the central discharge chamber 5 is reliably led or returned to the central discharge chamber.

If the filling level of the central discharge chamber 5 has then fallen back to the minimum level, the aeration of the next pair of grooves of the silo base 3 is switched on and the aeration of the venting channel 10 is switched off.

The lateral aerating arrangements **16*a*, 16*b* arranged in the region of the material inlet openings 13 are aerated together with the pneumatic aerating arrangements 17*a*, 17*b* located outside the venting channel 10 before the material inlet openings 13. These aerating arrangements 16*a*, 16*b*, 17*a*, 17*b* are operated simultaneously with the aerating arrangements of the opposite sector of the silo base 3**.

We claim:

1. A silo for storing and discharging bulk material comprising a material storage chamber having a base, a material discharge chamber positioned centrally of said base and extending therethrough, discharge openings in said discharge chamber for the discharge of material below said base, delivery openings in said discharge chamber peripherally thereof and above said base for delivery of material from said storage chamber into said discharge chamber, and a combination material delivery and discharge chamber venting channel extending from said discharge chamber across a limited peripheral sector of said base, said channel being in communication with both said storage and discharge chambers, whereby peripherally uniformed delivery of material from said storage chamber to said discharge chamber is accomplished with simultaneous venting of said discharge chamber.

2. The silo of claim 1 wherein said delivery openings extend continuously throughout the periphery of said discharge chamber including the peripheral area of communication with said channel.

3. The silo of claim 2 wherein said discharge chamber includes a vent opening located above said delivery openings and in communication with said channel, and vent means extending from said channel into communication with said storage chamber peripherally thereof.

4. The silo of claim 2 wherein said channel is provided with side walls and a cover, and additional material delivery openings are provided in said side walls.

5. The silo of claim 4 wherein said discharge chamber includes a vent opening located above said delivery openings and in communication with said channel, and vent means extending from said channel in communication with said storage chamber peripherally thereof.

6. The silo of claim 4 wherein pneumatic aerating means are provided to function with each of said material delivery openings to assist in movement of said material.

7. The silo of claim 6 wherein said discharge chamber includes a vent opening located above said delivery openings and in communication with said channel, and vent means extending from said channel in communication with said storage chamber peripherally thereof.

8. A method of operating a bulk material silo having a material discharge chamber in peripheral material transfer communication with a material storage chamber, said transfer communication including delivery openings directly communicating said discharge chamber with said storage chamber and an enclosed venting channel extending between said chambers and occupying a limited peripheral sector of said storage chamber, said method comprising:

(a) aerating said discharge chamber to move material therethrough;

(b) selectively aerating said venting channel to deliver material from said storage chamber therethrough to said discharge chamber when the level of said material in said discharge chamber is at a minimum;

(c) simultaneously aerating said delivery openings to deliver material through said openings into said discharge chamber directly from said storage chamber;

(d) terminating said selected and simultaneous aerating when the level of said material in said discharge chamber is at a maximum; and (e) thereafter aerating the interior of said venting channel to deliver material accumulated therein into said discharge chamber.

* * * * *